US012684127B2

(12) United States Patent
Ham et al.

(10) Patent No.: US 12,684,127 B2
(45) Date of Patent: Jul. 14, 2026

(54) QUANTIZATION APPARATUS AND METHOD FOR ARTIFICIAL NEURAL NETWORK AND IMAGE PROCESSING DEVICE HAVING THE SAME

(71) Applicant: UIF (University Industry Foundation), Yonsei University, Seoul (KR)

(72) Inventors: Bum Sub Ham, Seoul (KR); Jae Hyeon Moon, Seoul (KR); Do Hyung Kim, Goyang-si (KR); Jun Yong Cheon, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 363 days.

(21) Appl. No.: 18/456,020

(22) Filed: Aug. 25, 2023

(65) Prior Publication Data

US 2024/0406397 A1     Dec. 5, 2024

(30) Foreign Application Priority Data

Jun. 5, 2023     (KR) ........................ 10-2023-0072090

(51) Int. Cl.
*H04N 19/126* (2014.01)
*G06V 10/26* (2022.01)
(Continued)

(52) U.S. Cl.
CPC ........... *H04N 19/126* (2014.11); *G06V 10/26* (2022.01); *G06V 10/764* (2022.01);
(Continued)

(58) Field of Classification Search
CPC .... H04N 19/126; H04N 19/119; G06V 10/26; G06V 10/764; G06V 10/7715;
(Continued)

(56) References Cited

U.S. PATENT DOCUMENTS

| | | | | |
|---|---|---|---|---|
| 11,481,608 B2 * | 10/2022 | Ha | ........................... | G06F 18/15 |
| 11,568,251 B1 * | 1/2023 | Palkar | ..................... | G06F 18/10 |

(Continued)

FOREIGN PATENT DOCUMENTS

| | | |
|---|---|---|
| KR | 10-2019-0014900 A | 2/2019 |
| KR | 10-2021-0083935 A | 7/2021 |

(Continued)

OTHER PUBLICATIONS

Zhikai Li et al., RepQ-ViT: Scale Reparameterization for Post-Training Quantization of Vision Transformers arXiv: 2212.08254v1 [cs.CV] Dec. 16, 2022.

*Primary Examiner* — Utpal D Shah

(57) ABSTRACT

The present disclosure provides a quantization apparatus and method, and an image processing apparatus, capable of improving operation efficiency while suppressing performance degradation due to quantization errors by receiving one of a plurality of matrices obtained for neural network operation in an artificial neural network as an input matrix, dividing the input matrix into a plurality of channels, selecting a quantizer for each channel by analyzing the distribution of element values included in each of the plurality of divided channels, and quantizing element values included in the channels using the selected quantizer.

10 Claims, 8 Drawing Sheets

(51) Int. Cl.
    *G06V 10/764*      (2022.01)
    *G06V 10/77*       (2022.01)
    *G06V 10/82*       (2022.01)
    *H04N 19/119*    (2014.01)

(52) U.S. Cl.
    CPC .......... *G06V 10/7715* (2022.01); *G06V 10/82*
                 (2022.01); *H04N 19/119* (2014.11)

(58) Field of Classification Search
    CPC ........ G06V 10/82; G06N 3/045; G06N 3/063;
                 G06N 3/0495; G06F 17/16
    See application file for complete search history.

(56)               References Cited

U.S. PATENT DOCUMENTS

| | | | |
|---|---|---|---|
| 2018/0285736 A1* | 10/2018 | Baum ................. | G06F 12/0207 |
| 2020/0097823 A1* | 3/2020 | Chen ................... | G06N 3/0495 |
| 2021/0133278 A1* | 5/2021 | Fang ................... | G06N 3/0464 |
| 2023/0297836 A1* | 9/2023 | Vasyltsov ............. | G06N 3/084 |
| | | | 706/25 |
| 2023/0401834 A1* | 12/2023 | Liang ................... | G06V 10/40 |

FOREIGN PATENT DOCUMENTS

| | | |
|---|---|---|
| KR | 10-2375896 B1 | 3/2022 |
| KR | 10-2022-0051947 A | 4/2022 |
| WO | 2023/059699 A1 | 4/2023 |

* cited by examiner

QUANTIZATION APPARATUS AND METHOD FOR ARTIFICIAL NEURAL NETWORK AND IMAGE PROCESSING DEVICE HAVING THE SAME

CROSS-REFERENCE TO RELATED APPLICATIONS

This application claims priority under 35 U.S.C. § 119 (a) to Korean Patent Application No. 10-2023-0072090, filed on Jun. 5, 2023, with the Korean Intellectual Property Office, the disclosure of which is incorporated herein in its entirety by reference.

BACKGROUND

1. Technical Field

The present disclosure relates to a quantization apparatus and method for an artificial neural network and an image processing device having the same.

2. Description of the Related Art

Currently, artificial neural networks are actively used in a wide variety of fields, and are particularly useful in the field of image processing. In addition, in the field of image processing such as object recognition, object identification, object detection and object segmentation, among various artificial neural network models, vision transformer (ViT) is attracting attention as a major neural network model.

Vision Transformer is a neural network that applies the self-attention mechanism, which was mainly used in transformer, an artificial neural network for natural language processing, to the image processing field. Existing natural language processing transformers segmented a sentence into a plurality of tokens, and inferred an attention score representing a relationship between the plurality of segmented tokens, thereby estimating the meaning of the sentence. Similarly, the vision transformer segments an input image into a plurality of patches, encodes the patches, and estimates the overall meaning of the image based on the relationship between the encoded patches.

Meanwhile, in artificial neural networks, input values and weights are generally expressed as real values of a large number of bits (for example, 32 bits), and their operation results are also expressed as real values. Therefore, the operation efficiency is low, and thus a large amount of hardware resources are required. For this reason, in recent years, research is being actively conducted to improve the operation efficiency by quantizing, with a low number of bits (for example, 4, 6, or 8 bits), the input values and weights to be operated in an artificial neural network, to perform the operation.

However, when processing images using an artificial neural network such as the vision transformer, feature values are extracted by encoding input values having values in a very diverse range. Accordingly, when quantization is performed with the same quantizer for all elements of each matrix having input values in a diverse range, weights, and feature values, the performance of the artificial neural network is significantly degraded due to the large quantization error. Therefore, there is a demand for a quantization technique capable of improving operation efficiency while suppressing performance degradation.

SUMMARY OF THE INVENTION

An object of the present disclosure is to provide a quantization apparatus and method capable of suppressing performance degradation by effectively performing matrix operations, while suppressing performance degradation due to quantization and improving operation efficiency by selectively using quantizers having different level ranges according to the distribution of values for each channel, and an image processing device having the same.

A quantization apparatus, according to an embodiment of the present disclosure, may include: a memory; and a processor that executes at least a part of an operation according to a neural network model stored in the memory, wherein the processor receives one of a plurality of matrices obtained for neural network operation in an artificial neural network as an input matrix, divides the input matrix into a plurality of channels, selects a quantizer for each channel by analyzing the distribution of element values included in each of the plurality of divided channels, and quantizes element values included in the channels using the selected quantizer.

The processor may select a quantizer for quantizing the element value of the corresponding channel by checking the maximum value and the minimum value of the element value included in each channel.

The processor may select a quantizer having a minimum error distance by comparing the maximum and minimum values of element values included in each channel with upper and lower limits according to quantization ranges of each of a plurality of quantizers.

The processor may convert an image input to the artificial neural network, thereby dividing the obtained input matrix into a plurality of channels according to color information.

The processor may segment and convert the image input to the artificial neural network into a plurality of patches, thereby dividing the obtained input matrix into a plurality of channels according to each patch.

The processor may convert the image input to the artificial neural network, thereby dividing the obtained input matrix into a plurality of channels according to pixels of the image.

A quantization method, according to another embodiment of the present disclosure, may be performed by a processor executing at least part of an operation according to a neural network model, wherein the method includes the steps of: receiving one of a plurality of matrices obtained for neural network operation in an artificial neural network as an input matrix, and dividing the input matrix into a plurality of channels; selecting a quantizer for each channel by analyzing a distribution of element values included in each of the plurality of divided channels; and quantizing element values included in the channels using the selected quantizer.

An artificial neural network-based image processing device, according to another embodiment of the present disclosure, may include: a memory; and a processor that executes at least a part of an operation according to a neural network model stored in the memory, wherein the processor converts a received image to obtain an embedding matrix, quantizes the embedding matrix and a plurality of weight matrices obtained by training, respectively, performs a neural network operation on the quantized embedding matrix and the quantized weight matrices to identify a class, receives one of the embedding matrix or a feature map, which is a matrix obtained by matrix multiplication between the embedding matrix and the weight matrices, as an input matrix, divides the input matrix into a plurality of channels, selects a quantizer for each channel by analyzing a distribution of element values included in each of the plurality of divided channels, and quantizes element values included in a channel using the selected quantizer.

According to the quantization apparatus and method for an artificial neural network and an image processing device having the same, of the present disclosure, it is possible to improve the operation efficiency while suppressing performance degradation due to quantization errors, by checking the distribution of the input matrix, selecting quantizers having different level ranges, performing quantization using the selected quantizer, and then performing an operation.

DETAILED DESCRIPTION OF THE INVENTION

Hereinafter, specific embodiments according to embodiments of the present disclosure will be described with reference to the drawings. The following detailed description is provided to assist in a comprehensive understanding of the methods, apparatus and/or systems described herein. However, this is only an example, and the present disclosure is not limited thereto.

In describing the embodiments, when it is determined that detailed descriptions of known technologies related to the present disclosure may unnecessarily obscure the gist of the disclosed embodiments, detailed descriptions thereof will be omitted. In addition, terms used below are defined in consideration of functions in the present disclosure, which may vary depending on the customary practice or the intention of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described. In addition, terms such as "unit", "device", "module", "block", and the like described in the specification refer to units for processing at least one function or operation, which may be implemented by hardware, software, or a combination of hardware and software.

Figure 1:
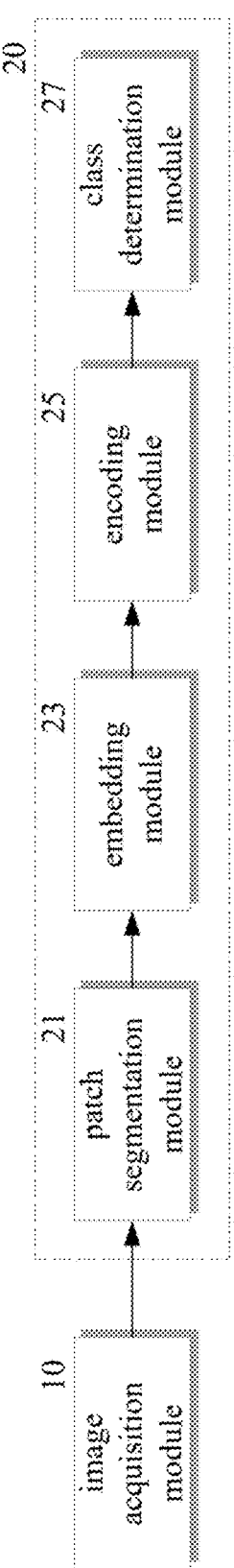
FIG. 1 shows a schematic configuration of an image processing device according to the present disclosure.
Figure 2:
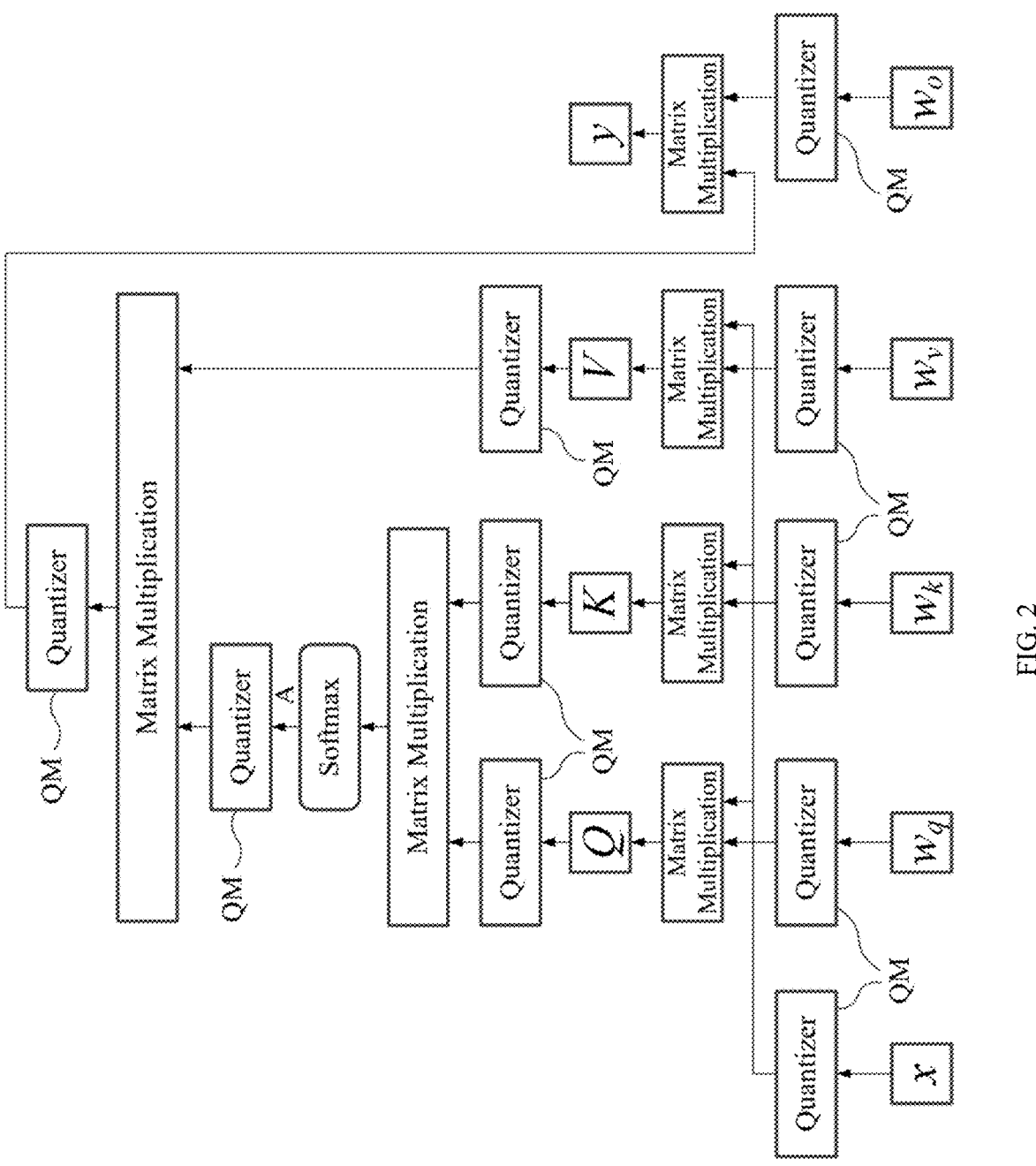
FIG. 2 shows an example of a detailed configuration of the encoding module of FIG. 1.

FIG. 1 shows a schematic configuration of an image processing device according to the present disclosure, and FIG. 2 shows an example of a detailed configuration of the encoding module of FIG. 1.

FIG. 1 shows configurations divided according to operations performed by an image processing device.

Referring to FIG. 1, the image processing device may include an image acquisition module 10 and an artificial neural network model 20. The image acquisition module 10 acquires an image to be processed. The image acquisition module 10 may be implemented as, for example, a photographing device that generates an image or a storage device that stores an image. Also, it may be implemented as a communication module that receives an image from another external device.

In addition, the artificial neural network model 20 receives the image acquired by the image acquisition module 10 and performs neural network operation. The artificial neural network model 20 is pre-trained to be suitable for the purpose of use of the image processing device, performs neural network operation on the received image according to the trained method, and outputs the result.

Here, the artificial neural network model is assumed to be a vision transformer as an example, but in the present disclosure, the artificial neural network model may be implemented as another artificial neural network model used for image processing.

The artificial neural network model 20 may include a patch segmentation module 21, an embedding module 23, an encoding module 25, and a class determination module 27.

The patch segmentation module 21 receives the image acquired by the image acquisition module 10 and segments it into a plurality of patches. For example, the patch segmentation module 21 may receive an image having a pixel size of 224×224 in height (H) and width (W) and segment it into 196 (=14×14) patches each having a size of 16×16 pixels. Here, since it is assumed that the artificial neural network model for image processing is implemented as a vision transformer, the patch segmentation module 21 is included, but if the artificial neural network model is implemented as another artificial neural network, the patch segmentation module 21 may be omitted.

The embedding module 23 receives the plurality of patches segmented by the patch segmentation module 21, and obtains an embedding matrix by embedding patch data of each of the plurality of patches according to the position of each patch in the image. The embedding module 23 may obtain an embedding matrix by embedding a plurality of pixel data included in each of the plurality of patches segmented from the image by linear transformation, and at this time, it may obtain the embedding matrix by arranging in consideration of the arrangement position of each patch. For example, the embedding module 23 may obtain an embedding matrix by constructing each row from patch data of a patch disposed at the upper left of the image and sequentially listing data of the patch disposed at the lower right in a column direction.

In the case of the above example, since each patch has a size of 16×16 pixels, and each pixel contains information for 3 channels of RGB color, the embedding module 23 may express each patch as a row having a length of 768 (=16×16×3). That is, each patch data may constitute one row of 768 length in the embedding matrix. In addition, since the number of patches is 196, the embedding module 23 may obtain an embedding matrix having a size of 768×196 by arranging a plurality of patches, each represented by a row, sequentially in a column direction according to the arrangement position of each patch.

However, the embedding module 23 may also obtain an embedding matrix as a 256×196×3 three-dimensional matrix by arranging information on three color channels in the depth direction, and may obtain the embedding matrix in other ways. That is, the embedding matrix may be variously obtained in the form of a 2-dimensional, 3-dimensional or multi-dimensional matrix according to the configuration of the artificial neural network model.

If the image is not segmented into a plurality of patches because the patch segmentation module 21 is not provided, the embedding module 23 may obtain an embedding matrix by linearly transforming each pixel data of the image.

In addition, when the image is segmented into a plurality of patches in the patch segmentation module 21 and applied, the embedding module 23 may include position data indicating positions of each of the plurality of patches in the image in the embedding matrix. That is, the embedding matrix may include pixel data and position data of each patch.

The encoding module 25 encodes the embedding matrix obtained in the embedding module 23 using a neural network operation according to the trained method. When the artificial neural network model is a vision transformer, the encoding module 25 includes at least one encoder. Here, the encoder may be a transformer encoder. Further, each encoder receives an output matrix output from the embedding matrix as an input matrix, and weights the received input matrix (X) with the weight matrix (W) by matrix multiplication. In addition, it may obtain an attention matrix (A) by estimating an attention value representing a correlation between the plurality of patches using a self-attention technique, and output an encoding matrix by additionally weighting the operation result of the input matrix (X) and the weight matrix (W) with the attention matrix (A).

The encoding module 25 may be implemented with one encoder that performs the above operations, but may also include a plurality of encoders. When the encoding module 25 is configured to include a plurality of encoders, the rest of the encoders, except for the encoder which receives embedding matrix, may perform operations in the same manner by receiving an encoding matrix output from an encoder arranged in a previous stage instead of the embedding matrix.

In addition, in the embodiments, each of the at least one encoder of the encoding module 25 may be provided with a plurality of quantization modules to quantize and then weight the elements (x, w) of the embedding matrix (X) and the weight matrix (W), and also quantize and then weight the attention score (a) of the attention matrix (A), so that the operation efficiency can be greatly improved.

Referring to FIG. 2, at least one encoder may include a plurality of quantization modules. The at least one encoder including a plurality of quantization modules receives an embedding matrix or an encoding matrix output from a previously arranged encoder as an element (x) of an input matrix (X) and quantizes with the quantization modules (QM). In addition, it also quantizes the weight (w) of the weight matrix (W) obtained by training with the quantization modules (QM). Here, it is assumed that the artificial neural network model is a vision transformer using the self-attention technique. In the self-attention technique, a query (Q), a key (K) and a value (V) are estimated based on an input matrix (X) and a weight matrix (W), and correlation between the plurality of patches is estimated using the estimated query (Q), key (K), and value (V). Accordingly, the weight matrix (W) may be obtained by being divided into a query weight matrix (W_q), a key weight matrix (W_k), a value weight matrix (W_v), and an output weight matrix (W_o). Here, each element value of the query weight matrix (W_q), key weight matrix (W_k), value weight matrix (W_v), and output weight matrix (W_o) is referred to as query weight (w_q), key weight (w_k), value weight (w_v), and output weight (w_o). In addition, the encoder may quantize each of the query weight (w_q), key weight (w_k), value weight (w_v), and output weight (w_o) with a quantization module (QM).

When the elements of the input matrix (X), the query weight matrix (W_q), the key weight matrix (W_k), the value weight matrix (W_v), and the output weight matrix (W_o) are each quantized, the encoder obtains a query (Q) and a key (K) and value (V) by weighting the quantized input matrix (X) with each of the quantized query weight matrix (W_q), key weight matrix (W_k), value weight matrix (W_v) and output weight matrix (W_o) by matrix multiplication. Queries (Q) and keys (K) and values (V) may also be obtained in matrix form. Then, by quantizing the elements of the obtained query (Q), key (K), and value (V) again with the quantization module, matrix-multiplying the quantized query (Q) and key (K), and converting them into probability values through softmax operation, an attention matrix (A) representing the importance according to the correlation between patches is obtained. Here, the attention matrix (A) is also composed of elements of the attention scores (a) in a matrix form. When the attention matrix (A) is obtained, the attention scores (a), which are elements of the obtained attention matrix (A), are quantized, the quantized attention matrix (A) is matrix-multiplied by the quantized values (V), and then matrix-multiplied by the quantized output weight matrix (W_o) again to output an output matrix (Y) having output values (y) as elements. Here, the output matrix (Y) may be applied as an input matrix (X) of the next placed encoder, and if the encoder is the last placed encoder of the encoding module 25, the output matrix (Y) may be passed to the class determination module 27 as an encoding matrix.

The class determination module 27 receives the encoding matrix encoded in the encoding module 25 and performs a neural network operation to determine the class. The class determination module 27 may determine a class for all or part of the image or a class for each pixel according to the purpose of the image processing device. For example, when the image processing device is used for purposes such as object recognition, object identification and object detection, the class determination module 27 may determine a class for the entire image or a partial region, and when the image processing device is used for object segmentation, the class determination module 27 may determine a class for each pixel of the image.

As described above, the encoder not only quantizes the input matrix (X) and the elements (W_q, W_k, W_v, W_o) of the various weight matrices (W_q, W_k, W_v, W_o) using a plurality of quantization modules (QM), but also repeatedly quantizes the matrix multiplication result between the quantized input matrix (X) and the various weight matrices (W_q, W_k, W_v), such that the matrix multiplication operation is performed with a smaller number of bits, thereby improving operation efficiency. At this time, each quantization module (QM) performs quantization in the same way for the matrix which is input.

For example, when quantizing all element values (x) of the input matrix (X) with 2 bits, the quantization module (QM) quantizing the input matrix (X) divides the quantization range, which is the range of element values quantized by the quantizer, into four quantization level sections to assign quantization values, checks the quantization level sections corresponding to the element values (x) and converts the element values (x) into corresponding quantization values. That is, the quantizer divides the quantization range into a plurality of quantization level sections according to the number of quantization bits, and converts the element value (x) into the quantization value assigned to the range including the element value (x) among the divided quantization ranges, thereby performing quantization.

At this time, the same quantization range and quantization level section are applied to all element values (x) of the input matrix (X). Although some quantization modules may adjust the quantization range and quantization level section by performing normalization, scaling, clipping, etc. based on the distribution of all element values (x) included in the input matrix (X), the adjusted quantization range and quantization level section are equally applied to all element values (x) included in the input matrix (X). For this reason, when the distribution difference of the element values (x) for each channel is large, the quantization error may be greatly increased.

Figure 3:
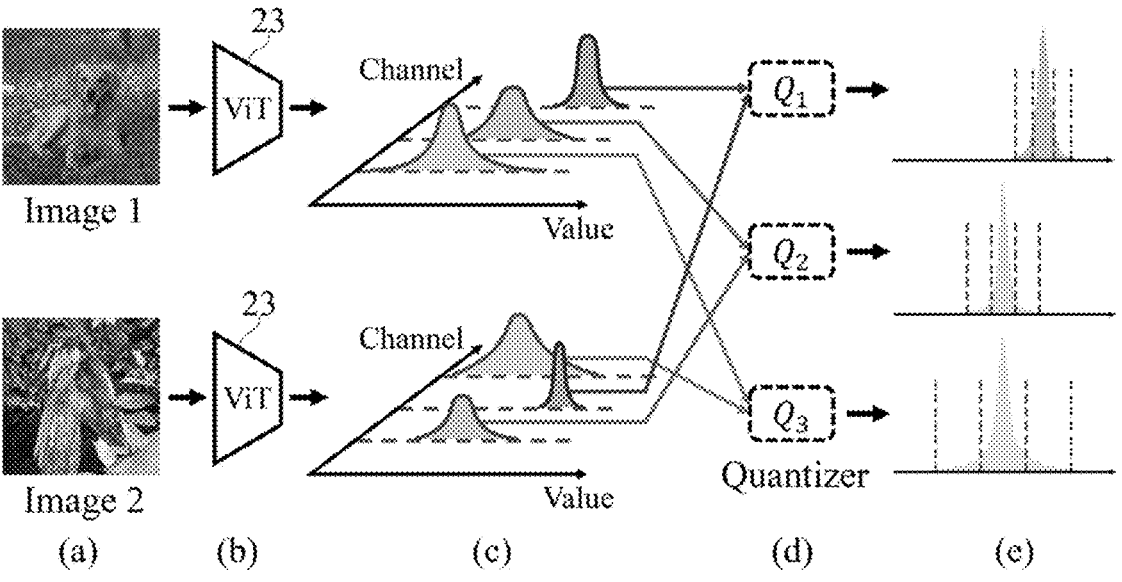
FIG. 3 and FIG. 4 show distributions of elements for each channel and each patch of an input matrix.
Figure 4:
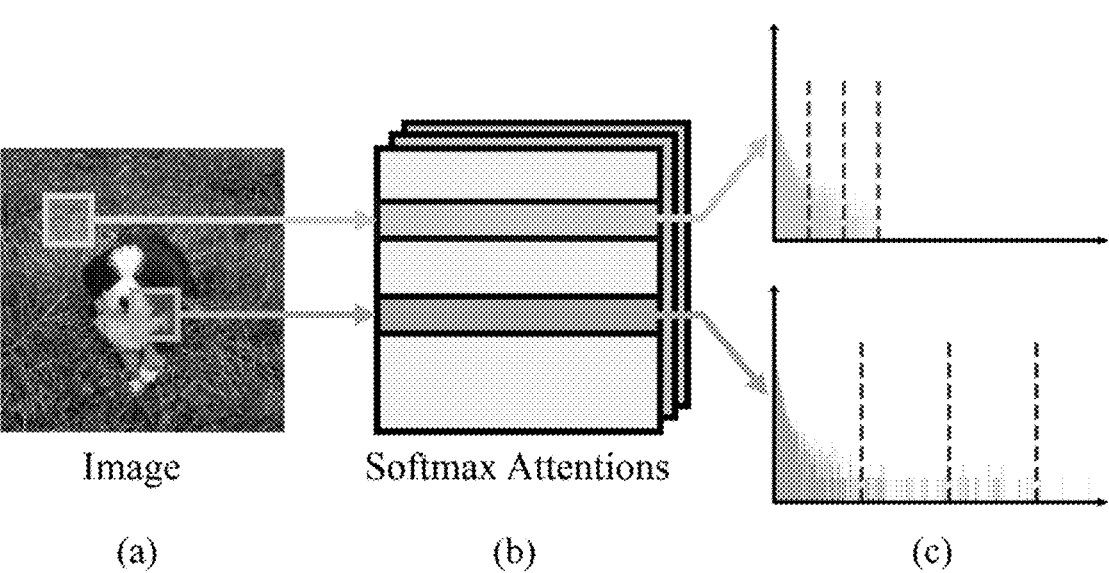

FIG. 3 and FIG. 4 show distributions of elements for each channel and each patch of an input matrix.

As described above, a wide variety of images can be input to the image processing device. In addition, each color distribution of each image may be very different from each other. As shown in FIG. 3 as an example, when the embedding module 23 as shown in (b) of FIG. 3 receives the first and second images (Image 1, Image 2, as shown in (a) of FIG. 3) respectively to obtain an embedding matrix, element value distributions for each channel in the embedding matrix may be very different from each other. Referring to FIG. 3, it can be seen that in the first and second images (Image 1, Image 2), the element value distribution of the blue channel is very wide, whereas the element value distribution of the red channel is very narrow and dense. In the graph (c) of FIG. 3, the direction of the horizontal axis represents the element value, and the direction of the vertical axis represents the appearance frequency. As such, even though the distribution of element values for each channel is very different, if a single quantizer is applied and quantized in the same level range, a quantization error appears very large. If the quantizer performs quantization by setting a quantization level range based on the blue channel, element values of the red channel are almost always quantized to the same value, and no difference occurs in quantization values. On the other hand, if the quantization range is set based on the red channel, most of the element values of the blue channel are clipped, resulting in a very large quantization error. That is, element values smaller than the quantization range and element values larger than the quantization range are not distinguished from each other. In addition, in the case of an artificial neural network, even though the frequency of occurrence is low, the maximum and minimum values may have a large effect on the performance of the neural network.

Therefore, as shown in (d) and (e) of FIG. 3, if quantization is performed by applying a plurality of quantizers having different quantization ranges for each channel, quantization error can be greatly reduced. Accordingly, in the present disclosure, the quantization module (QM), which operates as a quantization apparatus, selects the most suitable quantizer for a channel among a plurality of quantizers having different quantization ranges for each channel according to the element distribution for each channel, and performs quantization with the selected quantizer, thereby reducing quantization error.

Similarly, when an image, as shown in (a) of FIG. 4, is divided into a plurality of patches, pixels included in the same patch are adjacent to each other, so pixel data is often similar, but pixel data included in different patches may be very different, as shown in (b) of FIG. 4. Accordingly, as shown in (c) of FIG. 4, distribution of patch data for different patches may also appear very different. Accordingly, when each patch is input by constructing a row of an input matrix in the embedding module 23, data distribution for each row may be very different. In addition, if they are quantized with the same quantizer and the attention scores (a) are calculated in units of rows representing patches, this also causes performance degradation due to quantization errors.

Accordingly, in the present disclosure, the quantization module (QM), which operates as a quantization apparatus, may select the most suitable quantizer for a channel among a plurality of quantizers having different quantization ranges for each channel according to the element distribution for each patch, so that the quantization errors can be reduced.

Here, for convenience of understanding, the patch is expressed separately from the channel, but the division according to the patch in the input matrix can also be referred to as a channel that distinguishes the elements of the input matrix, and in some cases, data for each pixel composed of a depth direction vector in a 3D matrix may be divided into channels.

In the present disclosure, channels may be set differently according to characteristics of input matrices or configurations of weight matrices in consideration of a multiplication operation between a quantized input matrix and a quantized weight matrix performed after quantization.

Figure 5:
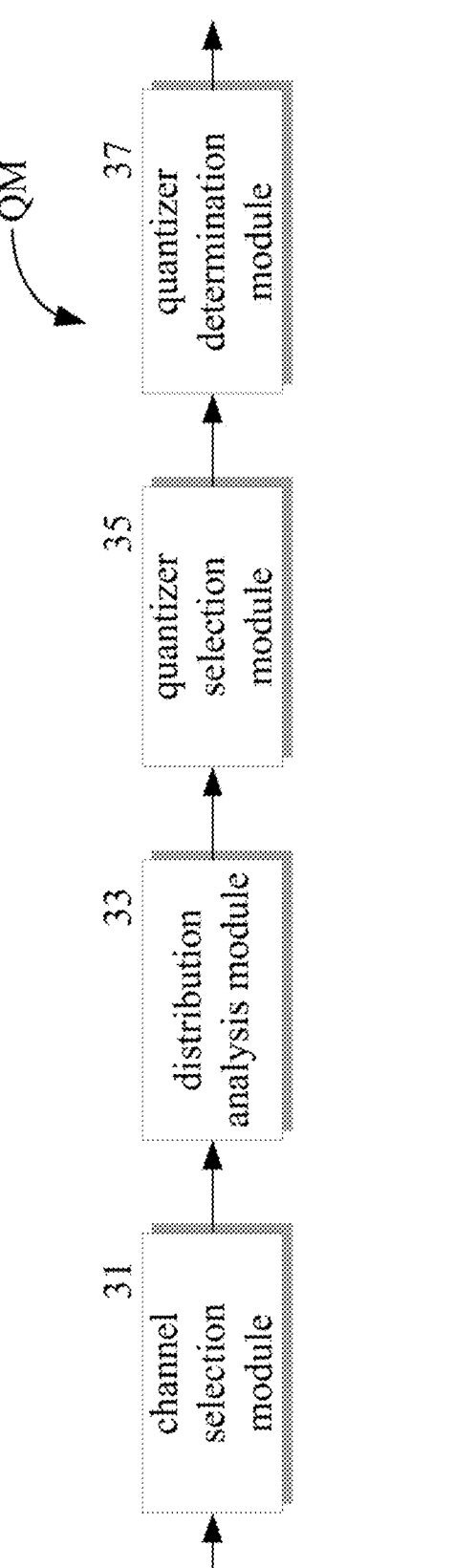
FIG. 5 shows an example of a detailed configuration of the quantization module of FIG. 2.
Figure 6:
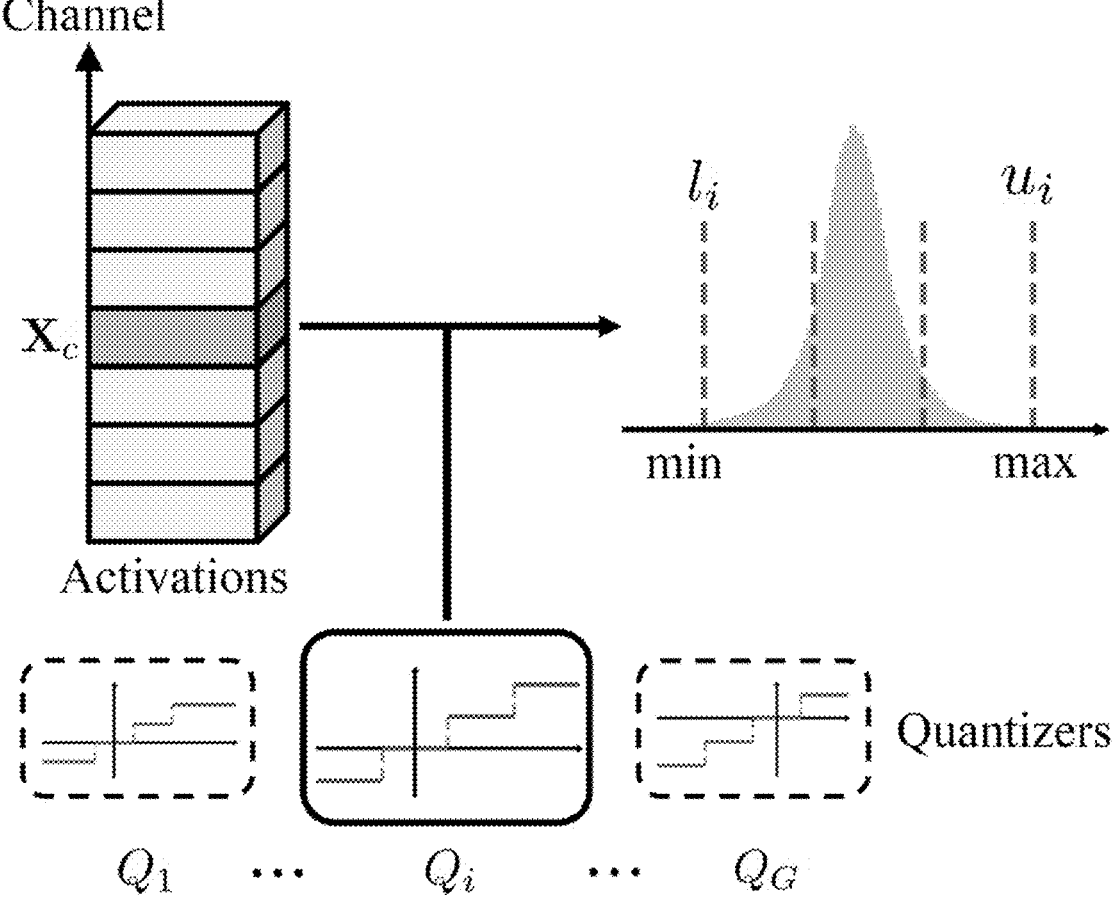
FIG. 6 is a diagram for explaining an operation of selecting a quantizer by the quantizer selection module of FIG. 5.

FIG. 5 shows an example of a detailed configuration of the quantization module of FIG. 2, and FIG. 6 is a diagram for explaining an operation of selecting a quantizer by the quantizer selection module of FIG. 5.

Referring to FIG. 5, in the present disclosure, the quantization module (QM) operating as a quantization apparatus may include a channel selection module 31, a distribution analysis module 33, a quantizer selection module 35, and a quantizer determination module 37.

The channel selection module 31 selects a channel according to the channel configuration in the input matrix (X). As described above, the channel ($X_c$) may be a color channel for dividing data for each RGB color, or may be a class for each patch. In addition, it may be a channel in which colors for each patch are divided, or when the input matrix is 3-dimensional, a channel in which vectors in a depth direction are divided. The channel selection module 31 may divide the input matrix (x) into a plurality of channels ($X_c$) according to the set channel division method, select and transmit each of the divided plurality of channels ($X_c$) to the distribution analysis module 33.

The distribution analysis module 33 analyzes the distribution of element values (x) of the selected channel ($X_c$). As shown in FIG. 6, the distribution analysis module 33 may check the maximum value ($max(X_c)$) and minimum value ($min(X_c)$) of the element values (x) included in each channel ($X_c$). In addition, the reason why the distribution analysis module 33 checks the maximum value ($max(X_c)$) and minimum value ($min(X_c)$) among the element values (x) of the channel ($X_c$) is, as described above, to prevent clipping by including both the maximum value ($max(X_c)$) and the minimum value ($min(X_c)$) in the quantization range as much as possible since the maximum value ($max(X_c)$) and minimum value ($min(X_c)$) of the elements in the channel ($X_c$) may have a great effect on the performance of the artificial neural network.

When the maximum value ($max(X_c)$) and minimum value ($min(X_c)$) of the elements are checked for each channel ($X_c$) by the distribution analysis module 33, as shown at the bottom of FIG. 6, the quantizer selection module 35 selects a quantizer ($Q_i$) having a quantization range most similar to the checked maximum value ($max(X_c)$) and minimum value $(\min(X_c))$ among a plurality of quantizers $(Q_1 \sim Q_G)$ having different quantization ranges provided in the quantizer determination module 37. At this time, the quantizer selection module 35 may calculate the error distance $(d(X_c, Q_i))$ between each of the upper limit $(u_i)$ and lower limit $(l_i)$ of the quantization range of each of the plurality of quantizers $(Q_1 \sim Q_G)$ and the maximum value $(\max(X_c))$ and minimum value $(\min(X_c))$ of the channel $(X_c)$ using Equation 1, and select a quantizer $(Q_i)$ having a minimum calculated error distance $(d(X_c, Q_i))$.

$$d(X_c, Q_i) = (\max(X_c) - u_i)^2 + (\min(X_c) - l_i)^2 \qquad \text{[Equation 1]}$$

Then, the quantizer determination module 37 quantizes an element value of a corresponding channel (or patch) $(X_c)$ in an input matrix (x) by using a quantizer $(Q_i)$ selected by the quantizer selection module 35 among a plurality of quantizers $(Q_1 \sim Q_G)$. Accordingly, the quantizer determination module 37 may quantize the element value of each channel (or patch) $(X_c)$ with quantizers having different quantization ranges.

In the above, it has been described that the quantizer determination module 37 includes a plurality of quantizers $(Q_1 \sim Q_G)$ and the quantizer selection module 35 selects a quantizer $(Q_i)$ corresponding to an element value distribution (here, the maximum value $(\max(X_c))$ and minimum value $(\min(X_c))$) of a channel $(X_c)$ from among the plurality of quantizers $(Q_1 \sim Q_G)$ provided in the quantizer determination module 37. However, in many cases, the quantizer is configured such that the quantization range is adjustable. In this case, the quantizer determination module 37 may include one quantizer, and the quantizer selection module 35 may instead be configured to adjust the quantization range of the quantizer for each channel $(X_c)$.

As described above, when the quantization module (QM) performs quantization with quantizers having different quantization ranges for each channel $(X_c)$, quantization errors can be reduced. However, an operation using a matrix quantized in a different quantization range for each channel $(X_c)$ must be normally performed.

Accordingly, a method of operating a matrix quantized with different quantization ranges for each channel $(X_c)$ will be described below.

Figure 7:
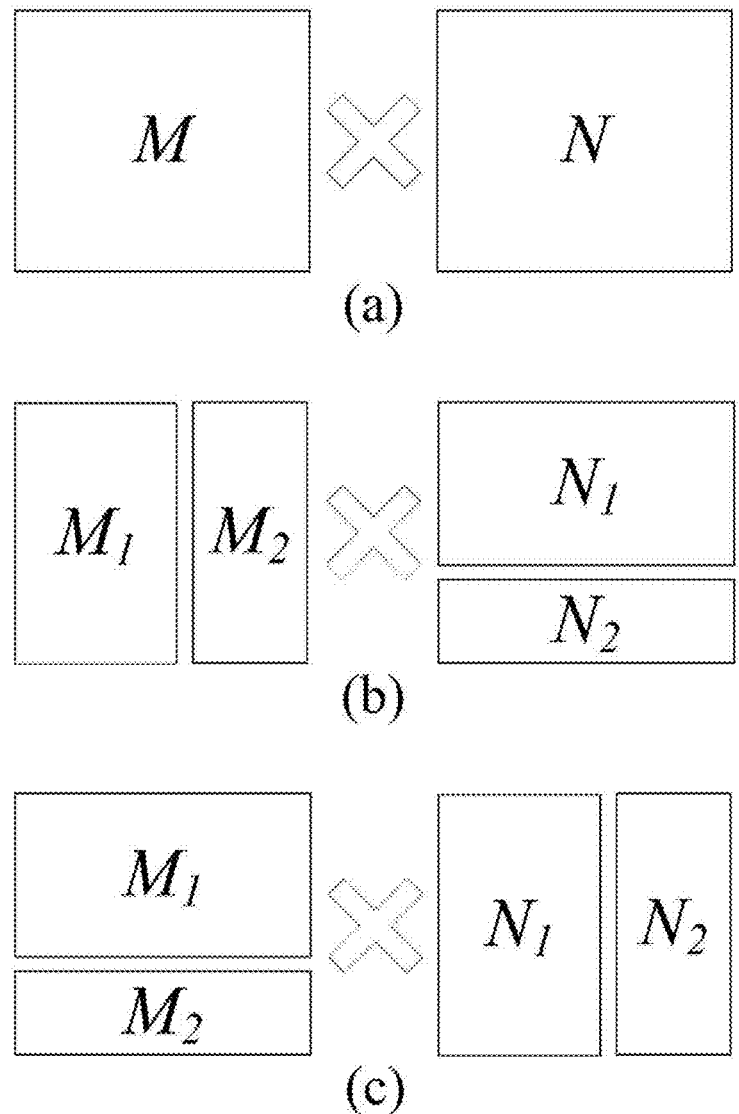
FIG. 7 is a diagram for explaining a method of operating matrices quantized differently in units of channels or patches.

FIG. 7 is a diagram for explaining a method of operating a matrix quantized differently for each channel.

In FIG. 7, (a) shows a conventional matrix multiplication operation method, and (b) and (c) are diagrams for explaining a method of operating a matrix differently quantized for each channel according to the present disclosure.

Referring to (a) of FIG. 7, when matrix multiplication is performed by quantizing the input matrix (M) and the weight matrix (N), the quantizer quantizes the input matrix (M) and the weight matrix (N) to obtain a quantization input matrix ($\overline{M}$) and a quantization weight matrix ($\overline{N}$). In this case, the input matrix (M) and the weight matrix (N) may be quantized by a quantizer having scaling values $(s_M, s_N)$, respectively. Here, the scaling values $(s_M, s_N)$ are parameters for adjusting the quantization range of the quantizer. The scaling value $(s_M)$ of the quantizer quantizing the input matrix (M) and the scaling value $(s_N)$ of the quantizer quantizing the weight matrix (N) may be different from or identical to each other. However, the scaling values $(s_M)$ of the quantizers that quantize all input values (m) of the input matrix (M) are the same, and the scaling values $(s_N)$ of the quantizers that quantize all weights (n) of the weight matrix (N) are the same.

Accordingly, the quantization input matrix ($\overline{M}$) and the quantization weight matrix ($\overline{N}$) may be expressed as $\overline{M} = s_M \cdot Q(M; s_M)$ and $\overline{N} = s_N \cdot Q(N; s_N)$, respectively, as shown in (a) of FIG. 7. Here, $Q(M; s_M)$ and $Q(N; s_N)$ each denote quantization level input matrices in which each element of the input matrix (M) and the weight matrix (N) is converted into bit values according to the quantization level. Therefore, multiplication between the quantization input matrix ($\overline{M}$) and the quantization weight matrix ($\overline{N}$) can be calculated as in Equation 2.

$$\overline{M}\overline{N} = s_M s_N \cdot Q(M; s_M) Q(N; s_N) \qquad \text{[Equation 2]}$$

That is, multiplication of the quantization input matrix ($\overline{M}$) and the quantization weight matrix ($\overline{N}$) may be performed by individually calculating the product of the scaling values $(s_M, s_N)$ and the product of the quantization level matrices $(Q(M; s_M), Q(N; s_N))$, and then multiplying them again.

Meanwhile, in (b) of FIG. 7, a case of matrix multiplication of the weight matrix (N) and the input matrix (M) divided into multiple (here, two) channels $(M_1, M_2)$ in the row direction is assumed. Here, the input matrix (M) divided in the row direction may be a division according to color channels in the embedding matrix, or may be a feature map in which the embedding matrix is already matrix-multiplied by another weight matrix. In addition, the weight matrix (N) may be a weight matrix (W) obtained through training.

All elements (n) of the weight matrix (N) are all quantized with a quantizer having the same scaling value $(s_N)$, but here, for convenience of understanding, the weight matrix (N) is divided into two regions $(N_1, N_2)$ that are multiplied by each of the two divided channels $(M_1, M_2)$ of the input matrix (M). The weight matrix (N) may also be quantized by dividing the channels, but when the weight matrix (N) is a weight matrix (W), it is assumed here that the weight matrix (W) is not only obtained by training, but also that the elements (n) of the weight matrix (N) are quantized with the same quantizer in order to prevent errors during multiplication with the input matrix (M).

The first and second channels $(\overline{M}_1, \overline{M}_2)$ of the quantization input matrix (M), which are quantized by quantizers having different scaling values $$\left( s_M^1, s_M^2 \right)$$

in the input matrix (M), may be represented by $$\overline{M}_1 = s_M^1 \cdot Q\left( M_1; s_M^1 \right)$$

and $$\overline{M}_2 = s_M^2 \cdot Q\left( M_2; s_M^2 \right),$$

respectively. In addition, corresponding to the quantized input matrix ($\overline{MN}$) divided into the first and second channels

11

$(\overline{M}_1, \overline{M}_2)$, the first and second regions $(\overline{N}_1, \overline{N}_2)$ of the quantization weight matrix $(\overline{N})$ may be expressed as $\overline{N}_1 = s_N \cdot Q(N_1; s_N)$ and $\overline{N}_2 = s_N \cdot Q(N_2; s_N)$, respectively.

Therefore, multiplication between the quantization input matrix $(\overline{M})$, quantized by different quantizers for each channel, and the quantization weight matrix $(\overline{N})$, can be calculated as in Equation 3.

$$\overline{M}\overline{N} = \overline{M}_1\overline{N}_1 + \overline{M}_2\overline{N}_2 \qquad \text{[Equation 3]}$$
$$= s_M^1 s_N \cdot Q(M_1; s_M^1) Q(N_1; s_N) +$$
$$s_M^2 s_N \cdot Q(M_2; s_M^2) Q(N_2; s_N)$$

That is, matrix multiplication between the quantization input matrix $(\overline{M})$, which is quantized differently for each channel $(M_1, M_2)$, and the quantization weight matrix $(\overline{N})$, may be performed by performing a simple matrix sum operation after each matrix multiplication according to the divided channels. Although an inter-matrix sum operation must be additionally performed after inter-matrix multiplication, the matrix multiplication operation basically consists of the sum operation after the inter-element multiplication, and the inter-matrix sum operation is not identical to this, but is performed similarly, so the overall operation complexity and amount of operation do not increase significantly compared to the matrix multiplication of the existing quantization matrix.

In addition, in (c) of FIG. 7, it is assumed that the input matrix (M) divided into a plurality of (here two) channels $(M_1, M_2)$ in the column direction and the weight matrix (N) are matrix-multiplied. Here, the input matrix (M) divided in the column direction may be an attention matrix (A) obtained by matrix multiplication and softmax operation of the query matrix (Q) and the key matrix (A) in FIG. 2, and the weight matrix (N) may be a value matrix (V).

As described above, in the self-emphasis technique, the similarity between patches is calculated using the attention matrix (A), and each patch constitutes one row by the embedding module 23, so that the attention matrix (A) may be divided into a plurality in the column direction. In addition, all elements (n) of the weight matrix (N) are quantized with quantizers having the same scaling value $(s_N)$, but for convenience of understanding, it is divided into two regions $(N_1, N_2)$ where each of the divided channels $(M_1, M_2)$ of the input matrix (M) is multiplied.

Also in (c) of FIG. 7, the first and second channels $(\overline{M}_1, \overline{M}_2)$ of the quantization input matrix $(\overline{M})$ quantized by quantizers having different scaling values $$\left(s_M^1, s_M^2\right)$$

in the input matrix (M) can be expressed as $$\overline{M}_1 = s_M^1 \cdot Q(M_1; s_M^1)$$

and $$\overline{M}_2 = s_M^2 \cdot Q(M_2; s_M^2),$$

12 respectively. In addition, corresponding to the quantized input matrix $(\overline{M}\overline{N})$ divided into the first and second channels $(\overline{M}_1, \overline{M}_2)$, the first and second regions $(\overline{N}_1, \overline{N}_2)$ of the quantization weight matrix $(\overline{N})$ may be expressed as $\overline{N}_1 = s_N \cdot Q(N_1; s_N)$ and $\overline{N}_2 = s_N \cdot Q(N_2; s_N)$, respectively.

However, in (c), since the channels extend in the row direction and are distinguished from each other in the column direction, multiplication between the quantization input matrix $(\overline{M})$, quantized by different quantizers for each channel, and the quantization weight matrix $(\overline{N})$, can be calculated as shown in Equation 4.

$$\overline{M}\overline{N} = Concat(\overline{M}_1\overline{N}_1, \overline{M}_2\overline{N}_2) \qquad \text{[Equation 4]}$$

That is, by performing each matrix multiplication according to the divided channels and then concatenating them, matrix multiplication between the quantization input matrix $(\overline{M})$, which is quantized differently for each channel $(M_1, M_2)$, and the quantization weight matrix $(\overline{N})$, may be performed.

Here, since each matrix multiplication is performed according to the divided channels and concatenated, even if quantization is performed with different quantizers for each channel $(M_1, M_2)$ in the input matrix (M), a matrix multiplication operation can be performed without an increase in computational complexity or amount of computation.

In a general quantization operation, if a matrix multiplication operation is performed by performing quantization using different quantizers having different quantization ranges, errors may occur due to differences in quantization ranges. However, the present disclosure is an invention for quantization for artificial neural networks, and as described above, in an artificial neural network, even if a matrix multiplication operation is performed by quantizing with different quantizers having different quantization ranges, if the same quantization operation is applied during training, the weight (w) of the weight matrix (W) is obtained by reflecting these characteristics, so that it is possible to greatly improve the operation efficiency due to quantization while minimizing the performance degradation of the artificial neural network.

In the illustrated embodiment, respective configurations may have different functions and capabilities in addition to those described below, and may include additional configurations in addition to those described below. In addition, in an embodiment, each configuration may be implemented using one or more physically separated devices, or may be implemented by one or more processors or a combination of one or more processors and software, and may not be clearly distinguished in specific operations unlike the illustrated example.

In addition, the image processing device and the quantization apparatus shown in FIGS. 1, 2 and 5 may be implemented in a logic circuit by hardware, firmware, software, or a combination thereof or may be implemented using a general purpose or special purpose computer. The apparatus may be implemented using hardwired device, field programmable gate array (FPGA) or application specific integrated circuit (ASIC). Further, the apparatus may be implemented by a system on chip (SoC) including one or more processors and a controller.

In addition, the image processing device and the quantization apparatus may be mounted in a computing device or server provided with a hardware element as a software, a hardware, or a combination thereof. The computing device or server may refer to various devices including all or some of a communication device for communicating with various devices and wired/wireless communication networks such as a communication modem, a memory which stores data for executing programs, and a microprocessor which executes programs to perform operations and commands.

Figure 8:
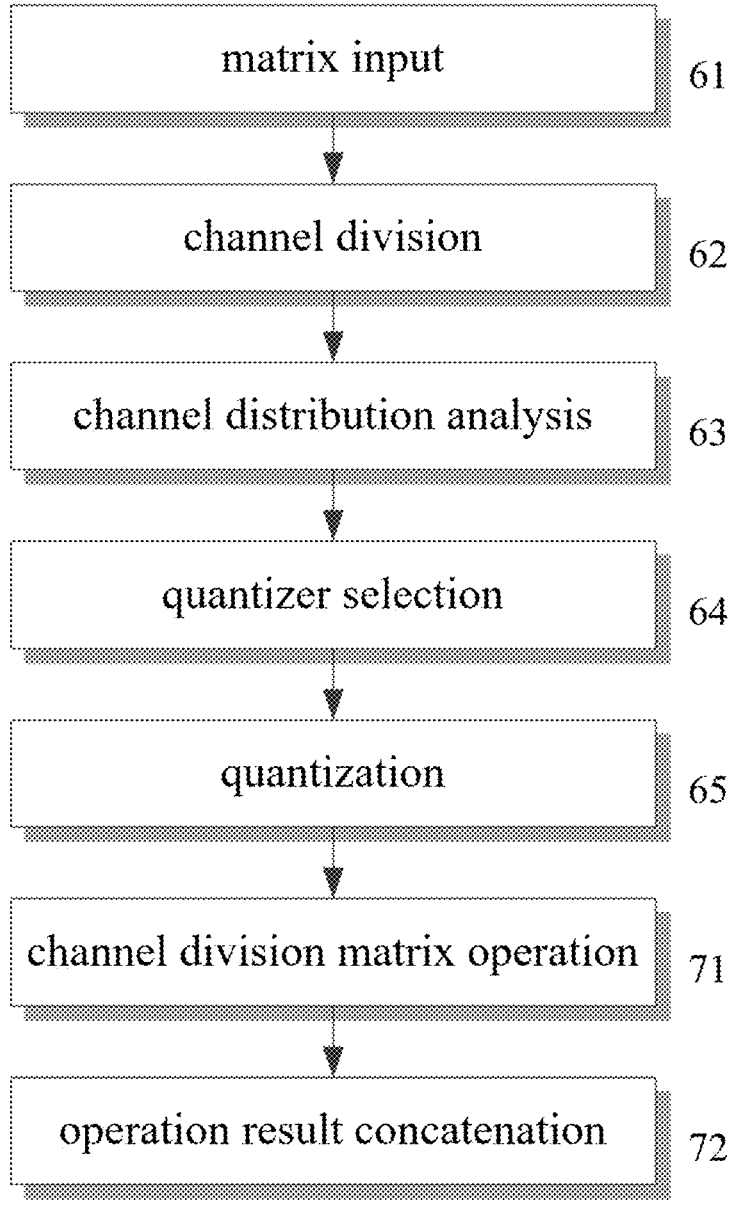
FIG. 8 shows a quantization method according to the present disclosure.

FIG. 8 shows a quantization method according to the present disclosure.

Referring to FIG. 8, in the quantization method according to the present disclosure, an input matrix (X) to be quantized is first applied (61). Then, the input matrix (X) is divided into a plurality of channels ($X_c$) (62). Here, the plurality of channels ($X_c$) may be divided in various ways according to criteria set in consideration of the characteristics of the input matrix (X) and the purpose of the matrix operation to be performed in the artificial neural network. For example, an input matrix (X) acquired based on an image may be divided into a plurality of channels ($X_c$) based on color, patch, and pixel according to the array configuration of elements, and in the artificial neural network, according to the purpose of performing matrix operation by quantizing the input matrix (X), the input matrix (X) can be divided into a plurality of channels ($X_c$) by setting one of color, patch, and pixel as a channel division criterion.

Even when the input matrix (X) applied to the quantization module is a weight matrix (W), the input matrix (X) may be divided into a plurality of channels ($X_c$), but here, it is assumed that channels are not divided for the weight matrix (W). If the input matrix (X) is divided into a plurality of channels ($X_c$), the data distribution for each channel ($X_c$) is analyzed (63). Here, the maximum value ($max(X_c)$) and minimum value ($min(X_c)$) of data for each channel ($X_c$) are checked.

Then, according to the maximum value ($max(X_c)$) and minimum value ($min(X_c)$) of the data for each channel ($X_c$) checked, one quantizer for quantizing an element value of a corresponding channel is selected from among a plurality of quantizers (64). At this time, among the plurality of quantizers, a quantizer having a minimum error distance ($d(X_c, Q_i)$) between the checked maximum value ($max(X_c)$) and minimum value ($min(X_c)$) and the upper limit ($u_i$) and lower limit ($l_i$) of the quantization range of each quantizer may be selected. In this case, the quantizers selected for each of the plurality of channels ($X_c$) may be different quantizers having different quantization ranges.

Then, the element values of the corresponding channel ($X_c$) are quantized by the selected quantizer (65).

Meanwhile, a quantizer for an artificial neural network quantizes elements of an input matrix basically to improve operation efficiency. Therefore, the artificial neural network must be able to perform a matrix operation, particularly a matrix multiplication operation, using a quantization input matrix quantized by a quantizer selected for each of a plurality of channels ($X_c$) in the quantizer.

In this case, in the matrix multiplication operation for the quantization input matrix ($\overline{M}$) quantized by the quantizer selected according to the channel and the weight matrix ($\overline{N}$) quantized by the quantizer regardless of the channel, the artificial neural network divides the region of the quantized weight matrix ($\overline{N}$) corresponding to the region of the divided channels of the input matrix ($\overline{M}$), and performs a matrix multiplication operation according to the region divided into channels (71). Then, a result of the matrix multiplication operation between the input matrix ($\overline{M}$) and the weight matrix ($\overline{N}$) is obtained by adding or concatenating the result of the matrix multiplication operation performed according to the region divided into channels according to the division direction of the channel.

In FIG. 8, it is described that respective processes are sequentially executed, which is, however, illustrative, and those skilled in the art may apply various modifications and changes by changing the order illustrated in FIG. 8 or performing one or more processes in parallel or adding another process without departing from the essential gist of the exemplary embodiment of the present disclosure.

Figure 9:
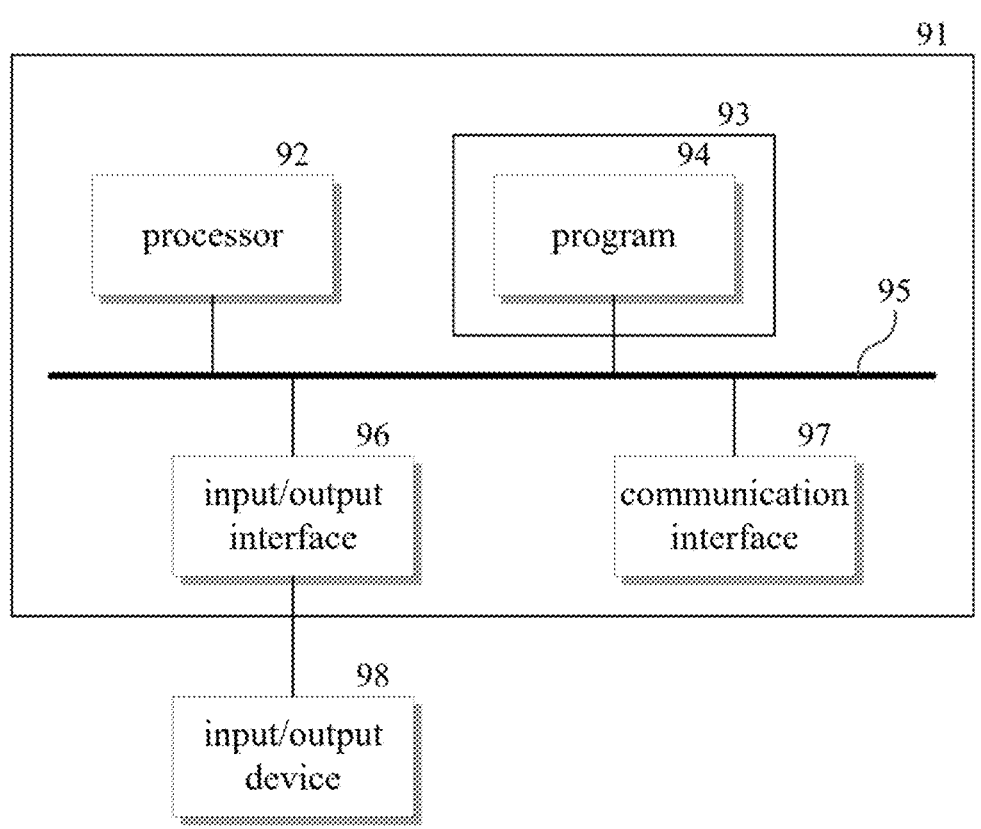
FIG. 9 is a diagram for describing a computing environment including a computing device according to an embodiment.

FIG. 9 is a diagram for describing a computing environment including a computing device according to an embodiment.

In the illustrated embodiment, respective configurations may have different functions and capabilities in addition to those described below, and may include additional configurations in addition to those described below. The illustrated computing environment 90 may include a computing device 91 to perform the quantization method illustrated in FIG. 8. In an embodiment, the computing device 91 may be one or more components included in the image processing device and the quantization apparatus shown in FIGS. 1, 2 and 5.

The computing device 91 includes at least one processor 92, a computer readable storage medium 93 and a communication bus 95. The processor 92 may cause the computing device 91 to operate according to the above-mentioned exemplary embodiment. For example, the processor 92 may execute one or more programs 94 stored in the computer readable storage medium 93. The one or more programs 94 may include one or more computer executable instructions, and the computer executable instructions may be configured, when executed by the processor 92, to cause the computing device 91 to perform operations in accordance with the exemplary embodiment.

The communication bus 95 interconnects various other components of the computing device 91, including the processor 92 and the computer readable storage medium 93.

The computing device 91 may also include one or more input/output interfaces 96 and one or more communication interfaces 97 that provide interfaces for one or more input/output devices 98. The input/output interfaces 96 and the communication interfaces 97 are connected to the communication bus 95. The input/output devices 98 may be connected to other components of the computing device 91 through the input/output interface 96. Exemplary input/output devices 98 may include input devices such as a pointing device (such as a mouse or trackpad), keyboard, touch input device (such as a touchpad or touchscreen), voice or sound input device, sensor devices of various types and/or photography devices, and/or output devices such as a display device, printer, speaker and/or network card. The exemplary input/output device 98 is one component constituting the computing device 91, may be included inside the computing device 91, or may be connected to the computing device 91 as a separate device distinct from the computing device 91.

The present invention has been described in detail through a representative embodiment, but those of ordinary skill in the art to which the art pertains will appreciate that various modifications and other equivalent embodiments are possible. Therefore, the true technical protection scope of the present invention should be defined by the claims.

What is claimed is:
1. A quantization apparatus, comprising:
a memory; and a processor that executes at least a part of an operation according to a neural network model stored in the memory, wherein the processor receives one of a plurality of matrices obtained for neural network operation in an artificial neural network as an input matrix, divides the input matrix into a plurality of channels, selects a quantizer for each channel by analyzing the distribution of element values included in each of the plurality of divided channels, and quantizes element values included in the channels using the selected quantizer, wherein the processor converts an image input to the artificial neural network, thereby dividing the obtained input matrix into a plurality of channels according to color information.

2. The quantization apparatus according to claim 1, wherein the processor selects a quantizer for quantizing the element value of the corresponding channel by checking the maximum value and the minimum value of the element value included in each channel.

3. The quantization apparatus according to claim 1, wherein the processor selects a quantizer having a minimum error distance by comparing the maximum and minimum values of element values included in each channel with upper and lower limits according to quantization ranges of each of a plurality of quantizers.

4. The quantization apparatus according to claim 1, wherein the processor segments and converts the image input to the artificial neural network into a plurality of patches, thereby dividing the obtained input matrix into a plurality of channels according to each patch.

5. The quantization apparatus according to claim 1, wherein the processor converts the image input to the artificial neural network, thereby dividing the obtained input matrix into a plurality of channels according to pixels of the image.

6. A quantization method, which is performed by a processor executing at least part of an operation according to a neural network model, wherein the method includes the steps of:

receiving one of a plurality of matrices obtained for neural network operation in an artificial neural network as an input matrix, and dividing the input matrix into a plurality of channels;

selecting a quantizer for each channel by analyzing a distribution of element values included in each of the plurality of divided channels; and quantizing element values included in the channels using the selected quantizer, wherein the step of dividing the input matrix into a plurality of channels comprises converting an image input to the artificial neural network, thereby dividing the obtained input matrix into a plurality of channels according to color information.

7. The quantization method according to claim 6, wherein the step of selecting a quantizer comprises selecting a quantizer for quantizing the element value of the corresponding channel by checking the maximum value and the minimum value of the element value included in each channel.

8. The quantization method according to claim 6, wherein the step of selecting a quantizer comprises selecting a quantizer having a minimum error distance by comparing the maximum and minimum values of element values included in each channel with upper and lower limits according to quantization ranges of each of a plurality of quantizers.

9. The quantization method according to claim 6, wherein the step of dividing the input matrix into a plurality of channels comprises segmenting and converting the image input to the artificial neural network into a plurality of patches, thereby dividing the obtained input matrix into a plurality of channels according to each patch.

10. The quantization method according to claim 6, wherein the step of dividing the input matrix into a plurality of channels comprises segmenting and converting the image input to the artificial neural network into a plurality of patches, thereby dividing the obtained input matrix into a plurality of channels according to pixels of the image.

* * * * *